US012568085B2

(12) United States Patent
Nadendla et al.

(10) Patent No.: US 12,568,085 B2
(45) Date of Patent: Mar. 3, 2026

(54) SYSTEMS AND METHODS FOR GENERATING SUB-IDENTITIES FOR WORKLOADS

(71) Applicant: Zscaler, Inc., San Jose, CA (US)

(72) Inventors: Arvind Nadendla, San Jose, CA (US); Subramanian Srinivasan, Milpitas, CA (US); Sanjay Kalra, San Jose, CA (US); Murat Bog, Fremont, CA (US)

(73) Assignee: Zscaler, Inc., San Jose, CA (US)

( * ) Notice: Subject to any disclaimer, the term of this patent is extended or adjusted under 35 U.S.C. 154(b) by 144 days.

(21) Appl. No.: 18/502,280

(22) Filed: Nov. 6, 2023

(65) Prior Publication Data

US 2025/0150455 A1     May 8, 2025

(51) Int. Cl.
    *H04L 9/40*          (2022.01)
    *H04L 47/10*         (2022.01)
(52) U.S. Cl.
    CPC .............. *H04L 63/10* (2013.01); *H04L 47/10* (2013.01); *H04L 63/0227* (2013.01); *H04L 63/1408* (2013.01)
(58) Field of Classification Search
    CPC ..... H04L 63/10; H04L 47/10; H04L 63/0227; H04L 63/1408; H04L 63/20
    See application file for complete search history.

(56) References Cited

U.S. PATENT DOCUMENTS

| | | | |
|---|---|---|---|
| 5,961,593 A | * | 10/1999 | Gabber ................. H04L 67/565 |
| | | | 713/153 |
| 6,407,997 B1 | | 6/2002 | Denap et al. |
| 6,434,150 B1 | | 8/2002 | Bog et al. |
| 6,490,273 B1 | | 12/2002 | Denap et al. |
| 6,539,386 B1 | | 3/2003 | Athavale et al. |
| 6,684,251 B1 | | 1/2004 | Qiu et al. |
| 7,096,189 B1 | | 8/2006 | Srinivasan |
| 7,254,114 B1 | | 8/2007 | Turner et al. |
| 7,421,483 B1 | | 9/2008 | Kalra et al. |
| 7,496,750 B2 | | 2/2009 | Kumar et al. |
| 7,551,567 B2 | | 6/2009 | Anthias et al. |
| 7,693,131 B2 | | 4/2010 | Kaplan et al. |
| 7,729,364 B2 | | 6/2010 | Bog et al. |
| 7,738,396 B1 | | 6/2010 | Turner et al. |
| 7,792,975 B1 | | 9/2010 | Dashora et al. |
| 7,869,352 B1 | | 1/2011 | Turner et al. |
| 7,881,967 B1 | | 2/2011 | Srinivasan et al. |
| 8,005,000 B1 | | 8/2011 | Srinivasan |
| 8,612,295 B2 | | 12/2013 | Gidwani et al. |
| 10,581,891 B1 | | 3/2020 | Kapoor et al. |

(Continued)

FOREIGN PATENT DOCUMENTS

| | | |
|---|---|---|
| EP | 2 357 772 B1 | 1/2017 |
| EP | 1 839 176 B1 | 6/2018 |
| EP | 4 167 116 A1 | 4/2023 |

*Primary Examiner* — Ramy M Osman

(74) *Attorney, Agent, or Firm* — Baratta Law PLLC; Lawrence A. Baratta, Jr.; Ryan Odessa

(57)                    ABSTRACT

Systems and methods for generating sub-identities for workloads in a cloud-based system. Various embodiments include receiving a key from an external system; generating one or more sub-identities from the key; assigning the one or more sub-identities to one or more workloads; and enforcing policies on the one or more workloads and traffic associated therewith based on the one or more sub-identities.

20 Claims, 11 Drawing Sheets

(56)                References Cited

U.S. PATENT DOCUMENTS

| 10,616,180 B2 | 4/2020 | Chanak et al. |
| 10,848,395 B2 | 11/2020 | Srinivasan |
| 10,986,114 B1 | 4/2021 | Singh et al. |
| 11,075,923 B1 | 7/2021 | Srinivasan et al. |
| 11,188,571 B1 | 11/2021 | Chen et al. |
| 11,256,759 B1 | 2/2022 | Chen et al. |
| 11,537,456 B2 | 12/2022 | Nadendla et al. |
| 11,652,872 B1 * | 5/2023 | Parla ................... H04L 63/1416 709/223 |
| 2003/0140113 A1 * | 7/2003 | Balasuriya ........... H04L 67/141 709/248 |
| 2004/0002903 A1 * | 1/2004 | Stolfo ................. G06Q 20/382 705/74 |
| 2005/0076248 A1 * | 4/2005 | Cahill ................. G06Q 20/382 726/19 |
| 2008/0002592 A1 * | 1/2008 | Yegani ............... H04L 47/2433 370/252 |
| 2010/0132031 A1 * | 5/2010 | Zheng ................. H04L 63/1416 726/13 |
| 2014/0258860 A1 | 9/2014 | Subramanian |
| 2016/0301661 A1 | 10/2016 | Poirier et al. |
| 2017/0054622 A1 * | 2/2017 | Mishra ............... H04W 12/088 |
| 2017/0093812 A1 * | 3/2017 | Schenk ................. H04L 51/214 |
| 2019/0081983 A1 * | 3/2019 | Teal ...................... H04L 9/3268 |
| 2019/0245782 A1 * | 8/2019 | Jin ........................ H04L 49/252 |
| 2021/0029119 A1 * | 1/2021 | Raman .................. H04W 12/37 |
| 2021/0318862 A1 | 10/2021 | Subramanian et al. |
| 2021/0360038 A1 | 11/2021 | Schlotman, Jr. et al. |
| 2022/0046059 A1 * | 2/2022 | Pandurangi ............ H04L 63/20 |
| 2022/0286854 A1 | 9/2022 | Howe et al. |
| 2022/0286894 A1 | 9/2022 | Howe et al. |
| 2022/0286912 A1 | 9/2022 | Howe et al. |
| 2023/0148392 A1 * | 5/2023 | Yu ........................... H04L 47/41 |
| 2024/0283826 A1 * | 8/2024 | Ganguli ............. H04L 63/0281 |
| 2024/0388606 A1 * | 11/2024 | Mihajlovic .............. H04L 9/40 |
| 2024/0422198 A1 * | 12/2024 | Pampati .................. H04L 63/10 |
| 2025/0147812 A1 * | 5/2025 | Nadendla ............... G06F 9/505 |
| 2025/0150455 A1 * | 5/2025 | Nadendla ............... H04L 63/10 |

* cited by examiner

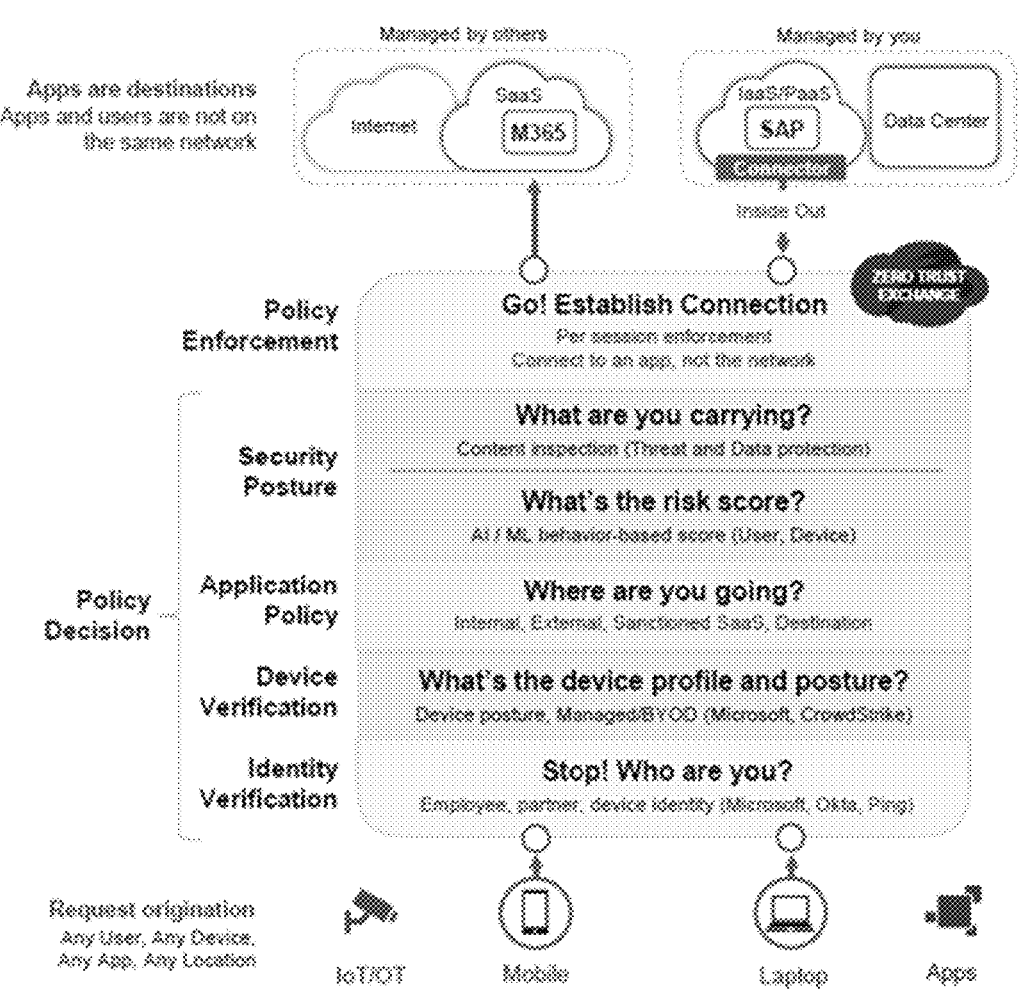
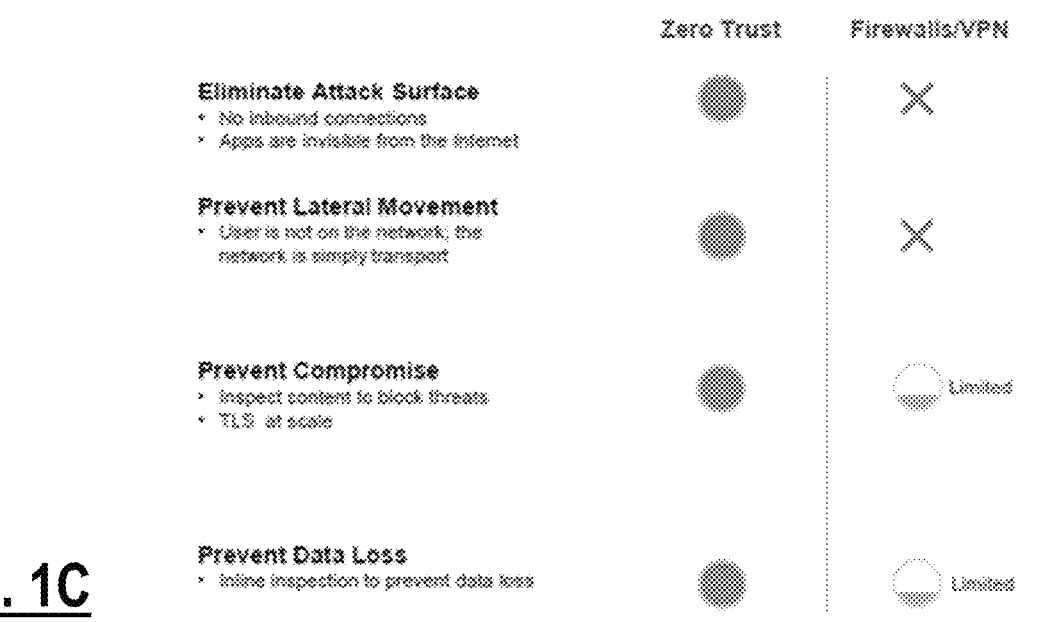
FIG. 1C

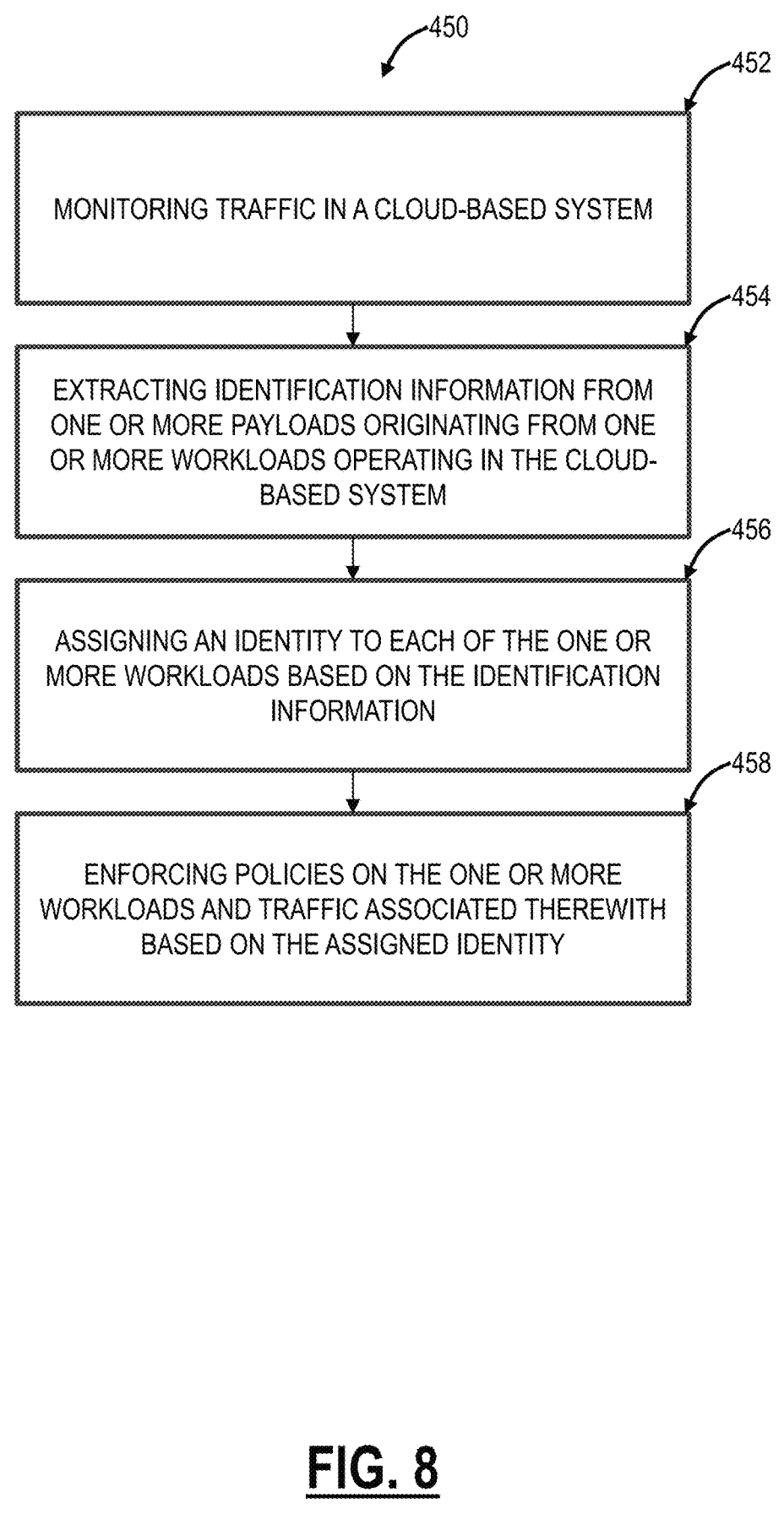

MONITORING TRAFFIC IN A CLOUD-BASED SYSTEM

454

EXTRACTING IDENTIFICATION INFORMATION FROM ONE OR MORE PAYLOADS ORIGINATING FROM ONE OR MORE WORKLOADS OPERATING IN THE CLOUD-BASED SYSTEM

456

ASSIGNING AN IDENTITY TO EACH OF THE ONE OR MORE WORKLOADS BASED ON THE IDENTIFICATION INFORMATION

458

ENFORCING POLICIES ON THE ONE OR MORE WORKLOADS AND TRAFFIC ASSOCIATED THEREWITH BASED ON THE ASSIGNED IDENTITY

FIG. 8

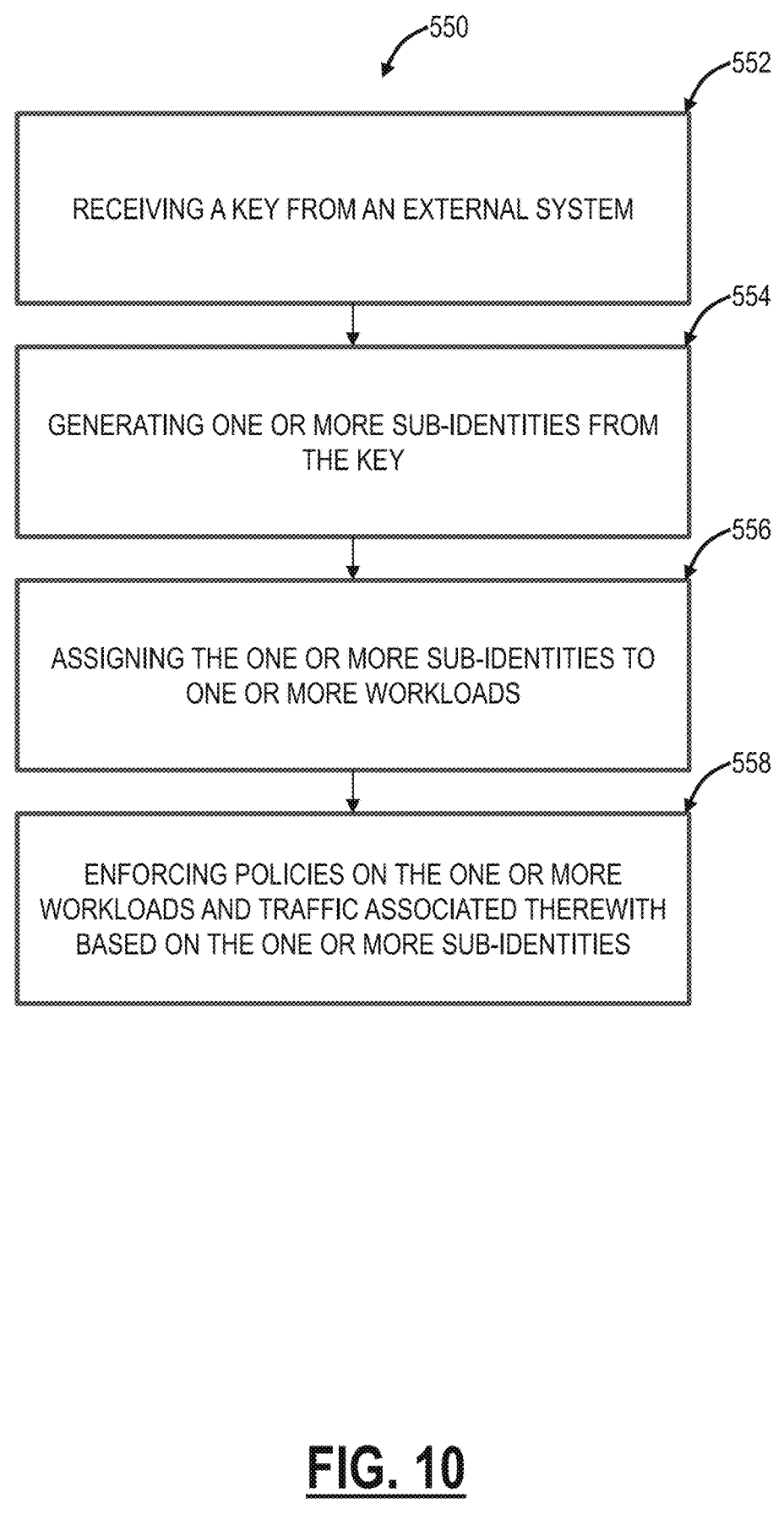

```
              ┌─550
              ↘
                                              ┌─552
    ┌─────────────────────────────────────────┐
    │                                         │
    │   RECEIVING A KEY FROM AN EXTERNAL SYSTEM │
    │                                         │
    └─────────────────────────────────────────┘
                      │
                      ▼                       ┌─554
    ┌─────────────────────────────────────────┐
    │                                         │
    │   GENERATING ONE OR MORE SUB-IDENTITIES FROM │
    │                 THE KEY                  │
    │                                         │
    └─────────────────────────────────────────┘
                      │
                      ▼                       ┌─556
    ┌─────────────────────────────────────────┐
    │                                         │
    │   ASSIGNING THE ONE OR MORE SUB-IDENTITIES TO │
    │        ONE OR MORE WORKLOADS             │
    │                                         │
    └─────────────────────────────────────────┘
                      │
                      ▼                       ┌─558
    ┌─────────────────────────────────────────┐
    │                                         │
    │   ENFORCING POLICIES ON THE ONE OR MORE  │
    │   WORKLOADS AND TRAFFIC ASSOCIATED THEREWITH │
    │   BASED ON THE ONE OR MORE SUB-IDENTITIES │
    │                                         │
    └─────────────────────────────────────────┘
```

FIG. 10

SYSTEMS AND METHODS FOR GENERATING SUB-IDENTITIES FOR WORKLOADS

FIELD OF THE DISCLOSURE

The present disclosure relates generally to networking and computing. More particularly, the present disclosure relates to systems and methods for generating sub-identities for workloads.

BACKGROUND OF THE DISCLOSURE

Workloads associated with cloud-based systems can interact with a plurality of external systems. These external systems can include third party applications, services, providers, etc. Traditionally, identities could not be assigned to workloads due to their dynamic characteristics. Because of this, it is difficult to enforce central policies on communications between these workloads and external systems. In order to expand the control of communication transiting cloud-based systems, the present disclosure provides systems and methods for identifying workloads based on information present in payloads to external systems. These identities can be used to enforce policy within the cloud-based system to protect data, enforce access control, enforce rate limits, etc. Further, the present disclosure provides methods to protect access keys provided by external systems.

BRIEF SUMMARY OF THE DISCLOSURE

In an embodiment, the present disclosure includes a method with steps, a cloud-based system configured to implement the steps, and a non-transitory computer-readable medium storing computer-executable instructions for causing performance of the steps. The steps include receiving a key from an external system; generating one or more sub-identities from the key; assigning the one or more sub-identities to one or more workloads; and enforcing policies on the one or more workloads and traffic associated therewith based on the one or more sub-identities.

The steps can further include performing inline monitoring via a cloud-based system of the one or more workloads; extracting identification information from one or more payloads originating from the one or more workloads, wherein the identification information includes a sub-identity; and enforcing policies on the one or more payloads based thereon. The one or more payloads can originate from the one or more workloads operating in a cloud-based system and are directed to the external system, wherein the one or more payloads are intercepted by the cloud-based system. Enforcing policies can include rate limiting, and access control based on a sub-identity identified in traffic. The one or more workloads can be associated with an enterprise having a plurality of departments, wherein the steps can further include: assigning each of the plurality of departments a sub-identity to utilize in payloads originating from workloads associated therewith. The enforcing policy can be based on a department to which a workload is assigned. The enforcing policy can include allowing or blocking traffic from a workload to the external system based on a department to which the workload is assigned. The one or more sub-identities can be customer specific, wherein the one or more sub-identities are only utilized within a cloud-based system. The steps can further include converting a sub-identity within a payload to the key prior to the payload reaching the external system. The key is not shared with the one or more workloads.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1C is a logical diagram illustrating zero trust policies with the cloud-based system and a comparison with the conventional firewall-based approach.

FIG. 4 is a block diagram of a user device, which may be used with the cloud-based system or the like.

FIG. 8 is a flow chart of a process for determining and assigning identities to workloads in a cloud-based system.

FIG. 10 is a flow chart of a process for generating sub-identities for workloads.

DETAILED DESCRIPTION OF THE DISCLOSURE

Cloud-based security solutions have emerged, such as Zscaler Internet Access (ZIA) and Zscaler Private Access (ZPA), available from Zscaler, Inc., the applicant and assignee of the present application. ZPA is a cloud service that provides seamless, zero trust access to private applications running on the public cloud, within the data center, within an enterprise network, etc. As described herein, ZPA is referred to as zero trust access to private applications or simply a zero trust access service. Here, applications are never exposed to the Internet, making them completely invisible to unauthorized users. The service enables the applications to connect to users via inside-out connectivity versus extending the network to them. Users are never placed on the network. This Zero Trust Network Access (ZTNA) approach supports both managed and unmanaged devices and any private application (not just web apps).

Example Cloud-Based System Architecture

Figure 1A:
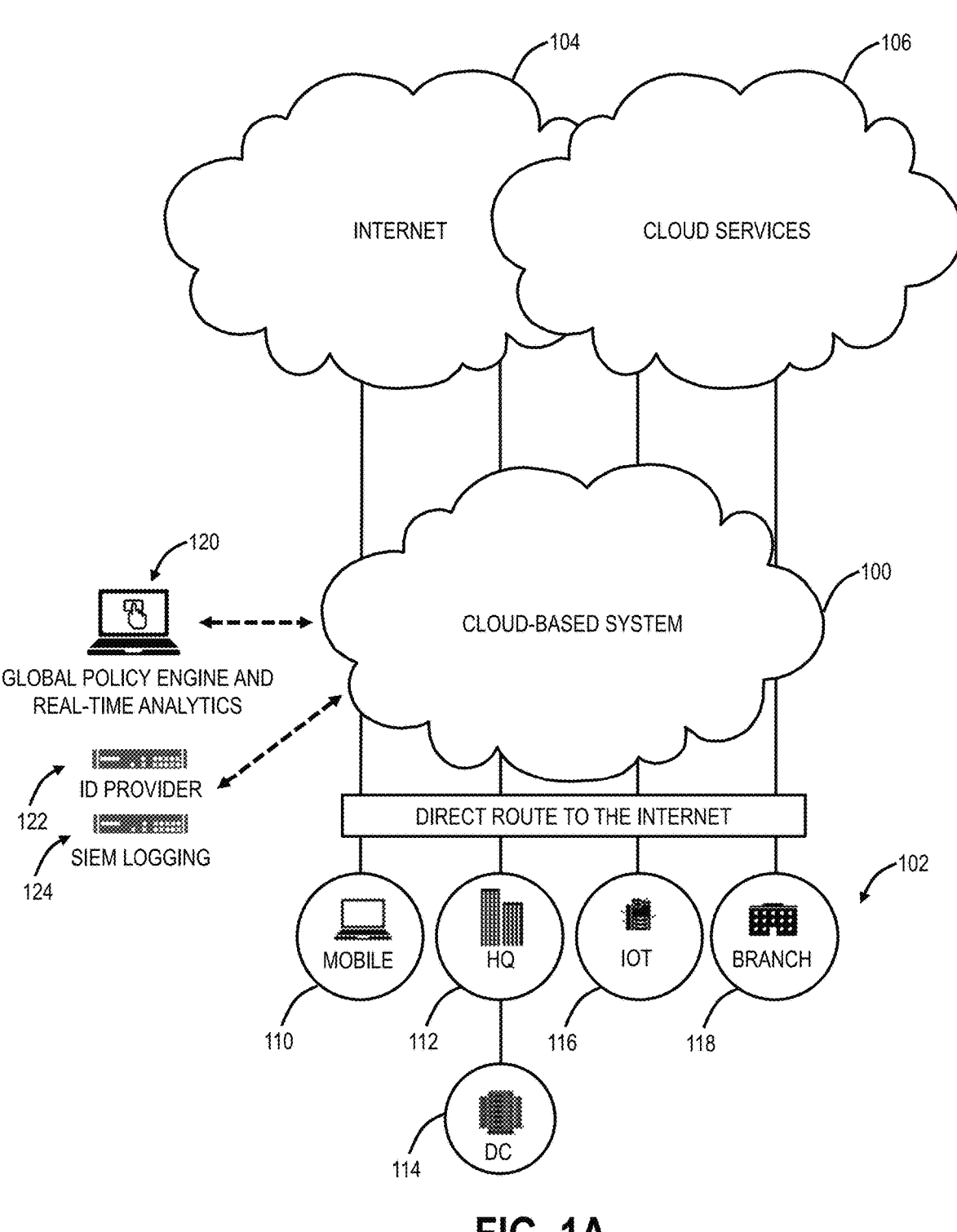
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
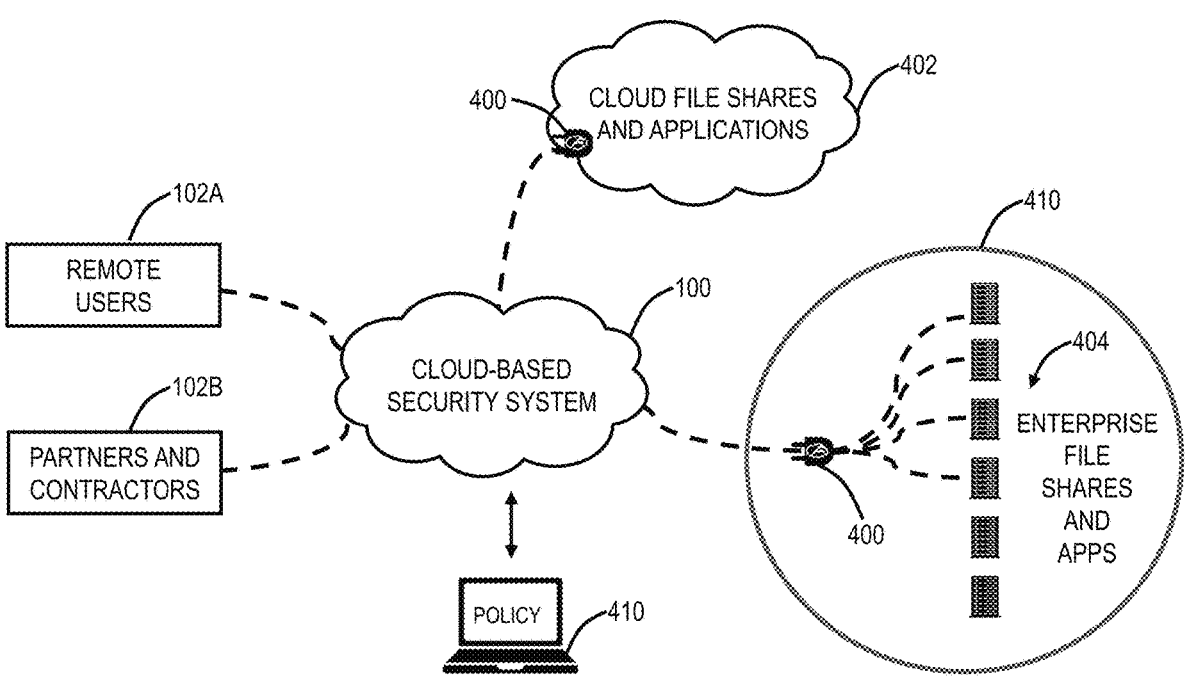
FIG. 5 is a network diagram of a Zero Trust Network Access (ZTNA) application utilizing the cloud-based system.

For illustration purposes, the users 102 of the cloud-based system 100 can include a mobile device 110, a headquarters (HQ) 112 which can include or connect to a data center (DC) 114, Internet of Things (IOT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes-they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Zero Trust

Figure 1B:
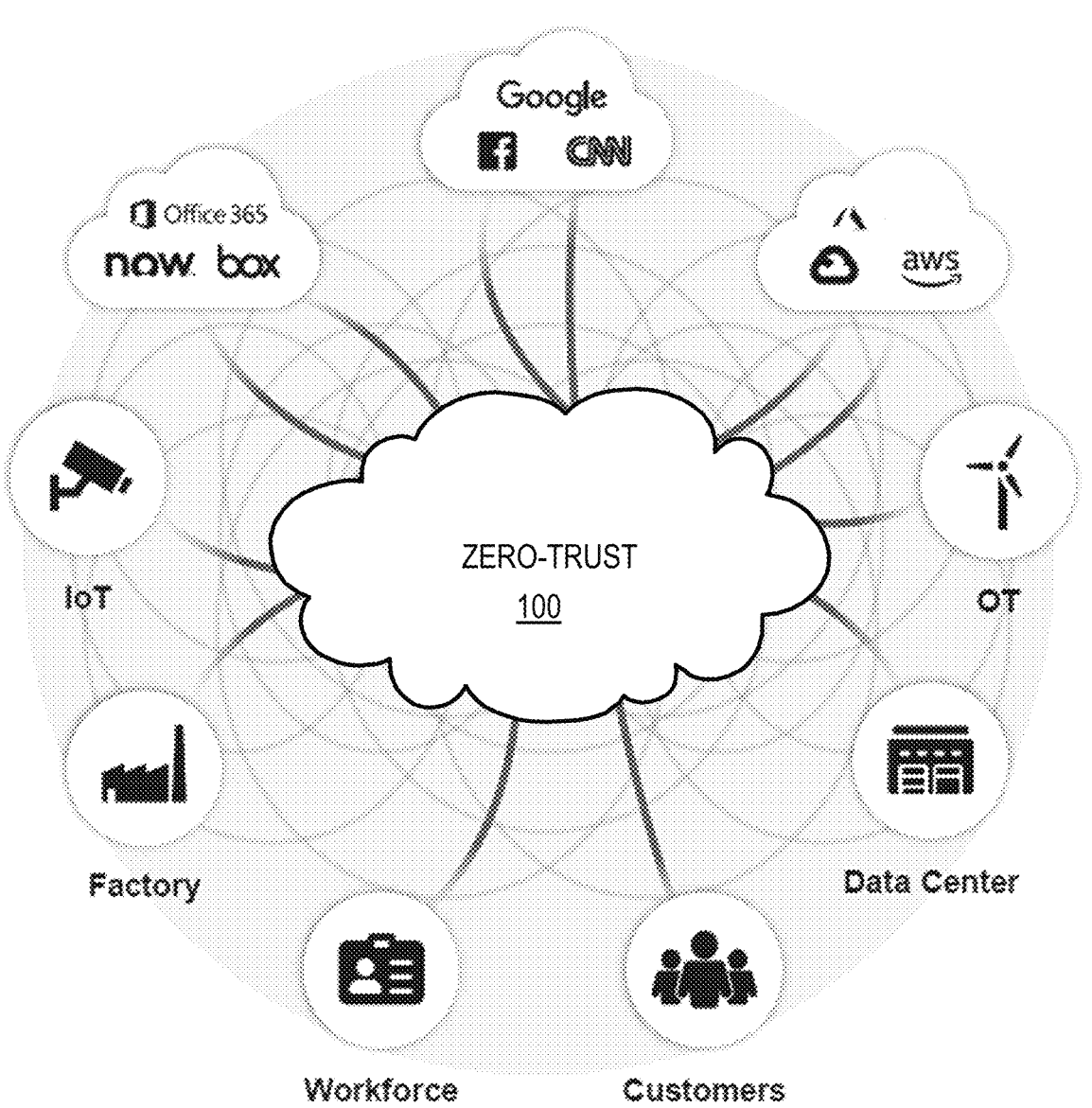
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its Core are Three Tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based System

Figure 2:
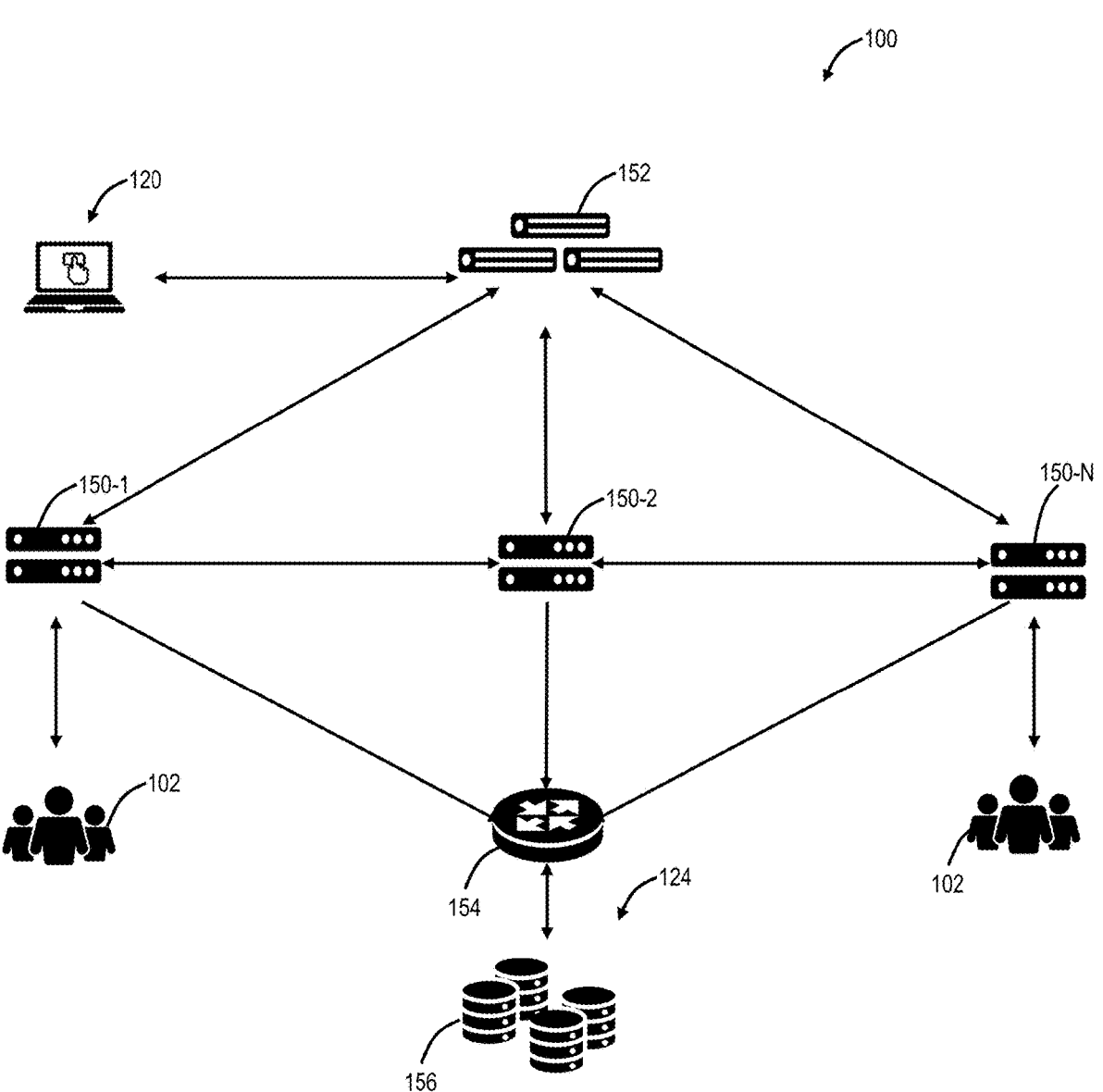
FIG. 2 is a network diagram of an example implementation of the cloud-based system.
Figure 4:
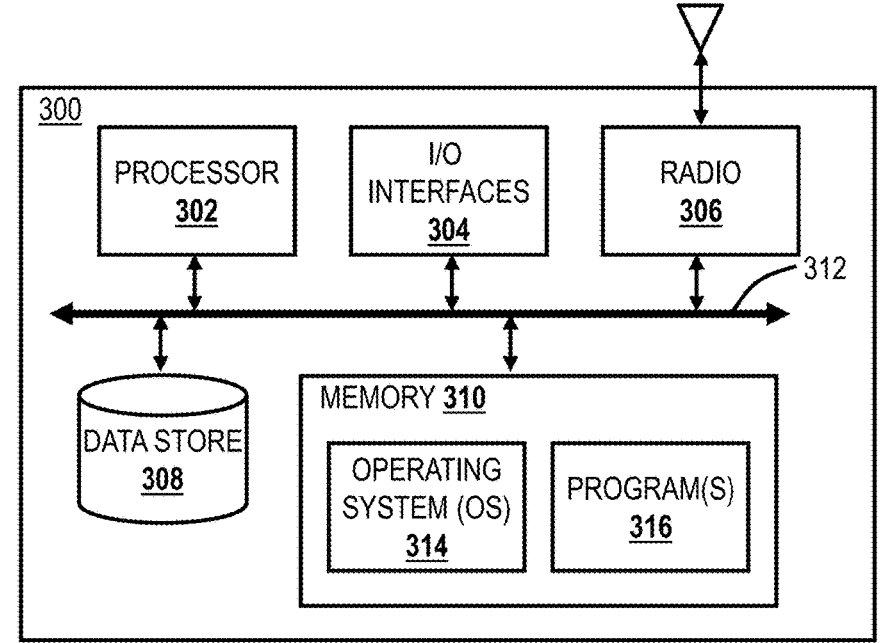

FIG. 2 is a network diagram of an example implementation of the cloud-based system 100. In an embodiment, the cloud-based system 100 includes a plurality of nodes (EN) 150, labeled as nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the nodes 150. The central authority 152 provide centralized policy, real-time threat updates, etc. and coordinates the distribution of this data between the nodes 150. The nodes 150 provide an onramp to the users 102 and are configured to execute policy, based on the central authority 152, for each user 102. The nodes 150 can be geographically distributed, and the policy for each user 102 follows that user 102 as he or she connects to the nearest (or other criteria) node 150.

Of note, the cloud-based system 100 is an external system meaning it is separate from tenant's private networks (enterprise networks) as well as from networks associated with the devices 110, 116, and locations 112, 118. Also, of note, the present disclosure describes a private node 150P that is both part of the cloud-based system 100 and part of a private network. Further, the term nodes as used herein with respect to the cloud-based system 100 can be one or more servers, including physical servers, virtual machines (VM) executed on physical hardware, appliances, custom hardware, compute resources, clusters, etc., as described above, i.e., the nodes 150 contemplate any physical implementation of computer resources. In some embodiments, the nodes 150 can be Secure Web Gateways (SWGs), proxies, Secure Access Service Edge (SASE), etc.

The nodes 150 are full-featured secure internet gateways that provide integrated internet security. They inspect all web traffic bi-directionally for malware and enforce security, compliance, and firewall policies, as described herein, as well as various additional functionality. In an embodiment, each node 150 has two main modules for inspecting traffic and applying policies: a web module and a firewall module. The nodes 150 are deployed around the world and can handle hundreds of thousands of concurrent users with millions of concurrent sessions. Because of this, regardless of where the users 102 are, they can access the Internet 104 from any device, and the nodes 150 protect the traffic and apply corporate policies. The nodes 150 can implement various inspection engines therein, and optionally, send sandboxing to another system. The nodes 150 include significant fault tolerance capabilities, such as deployment in active-active mode to ensure availability and redundancy as well as continuous monitoring.

In an embodiment, customer traffic is not passed to any other component within the cloud-based system 100, and the nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the nodes 150. In another embodiment, specific data specified by each tenant, e.g., only email, only executable files, etc., is processed through one of the nodes 150.

Each of the nodes 150 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the node 150 may allow the distribution of the content item, preclude distribution of the content item, allow distribution of the content item after a cleaning process, or perform threat detection on the content item. In an embodiment, the actions taken by one of the nodes 150 may be determinative on the threat classification of the content item and on a security policy of the tenant to which the content item is being sent from or from which the content item is being requested by. A content item is violating if, for any part C=[c1, c2, . . . , cm] of the content item, at any of the nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The nodes 150 establish persistent connections to the central authority 152 to download all policy configurations. When a new user connects to a node 150, a policy request is sent to the central authority 152 through this connection. The central authority 152 then calculates the policies that apply to that user 102 and sends the policy to the node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the nodes 150 request the new policy when the user 102 next makes a request. In an embodiment, the node 150 exchange "heartbeats" periodically, so all nodes 150 are informed when there is a policy change. Any node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

Figure 3:
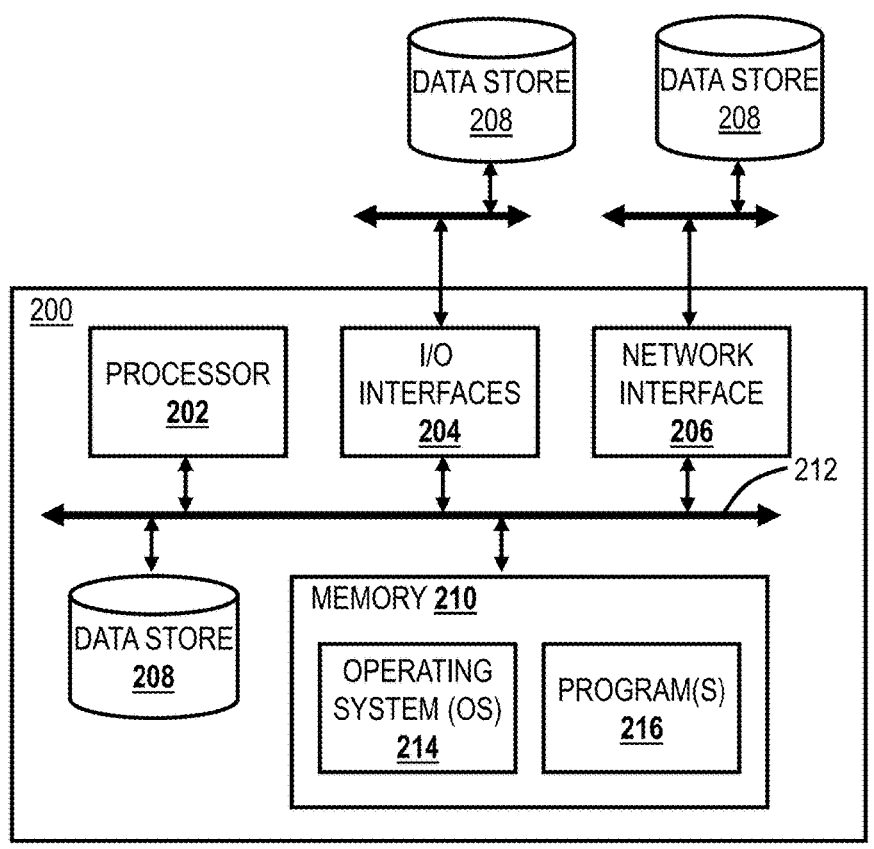
FIG. 3 is a block diagram of a server, which may be used in the cloud-based system, in other systems, or standalone.

FIG. 3 is a block diagram of a server 200, which may be used in the cloud-based system 100, in other systems, or standalone. For example, the nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IOT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like.

System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Zero Trust Network Access Using the Cloud-Based System

FIG. 5 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 410 that includes enterprise file shares and applications 404. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by an application 350 on the user device 300. Also, the applications 402, 404 can include B2B applications. Note, the difference between the applications 402, 404 is the applications 402 are hosted in the cloud, whereas the applications 404 are hosted on the enterprise network 410. The services described herein contemplates use with either or both of the applications 402, 404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant-if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises.

Digital Experience Monitoring

Figure 6:
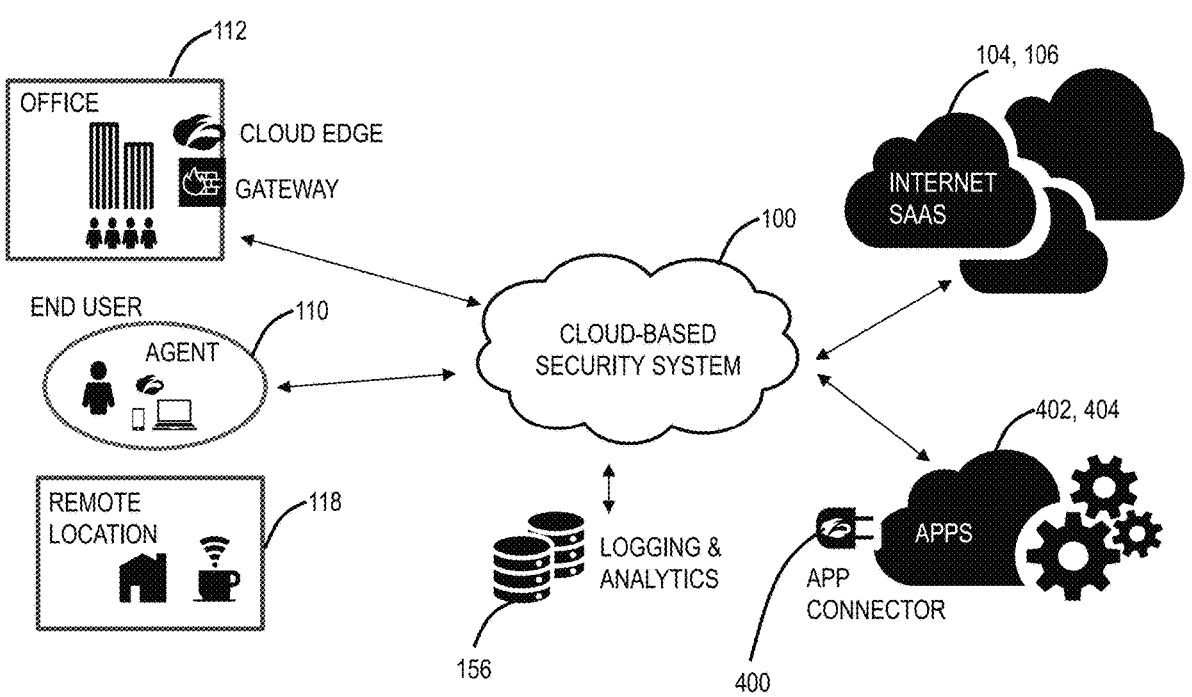
FIG. 6 is a network diagram of the cloud-based system in an application of digital experience monitoring.

FIG. 6 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 110, 112, 118 to the applications 402, 404, the Internet 104, the cloud services 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

Application-Related Data

| | |
|---|---|
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

Network-Related Data

| | |
|---|---|
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

Device-Related Data (Endpoint-Related Data)

| | |
|---|---|
| System details | Network (config) |
| Central Processing Unit (CPU) | Disk |

-continued

| | |
|---|---|
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in the context of an inline transaction by the application 350 or cloud edge. The metrics can be tagged with metadata (user, time, app, etc.) and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

User Device Application for Traffic Forwarding and Monitoring

Figure 7:
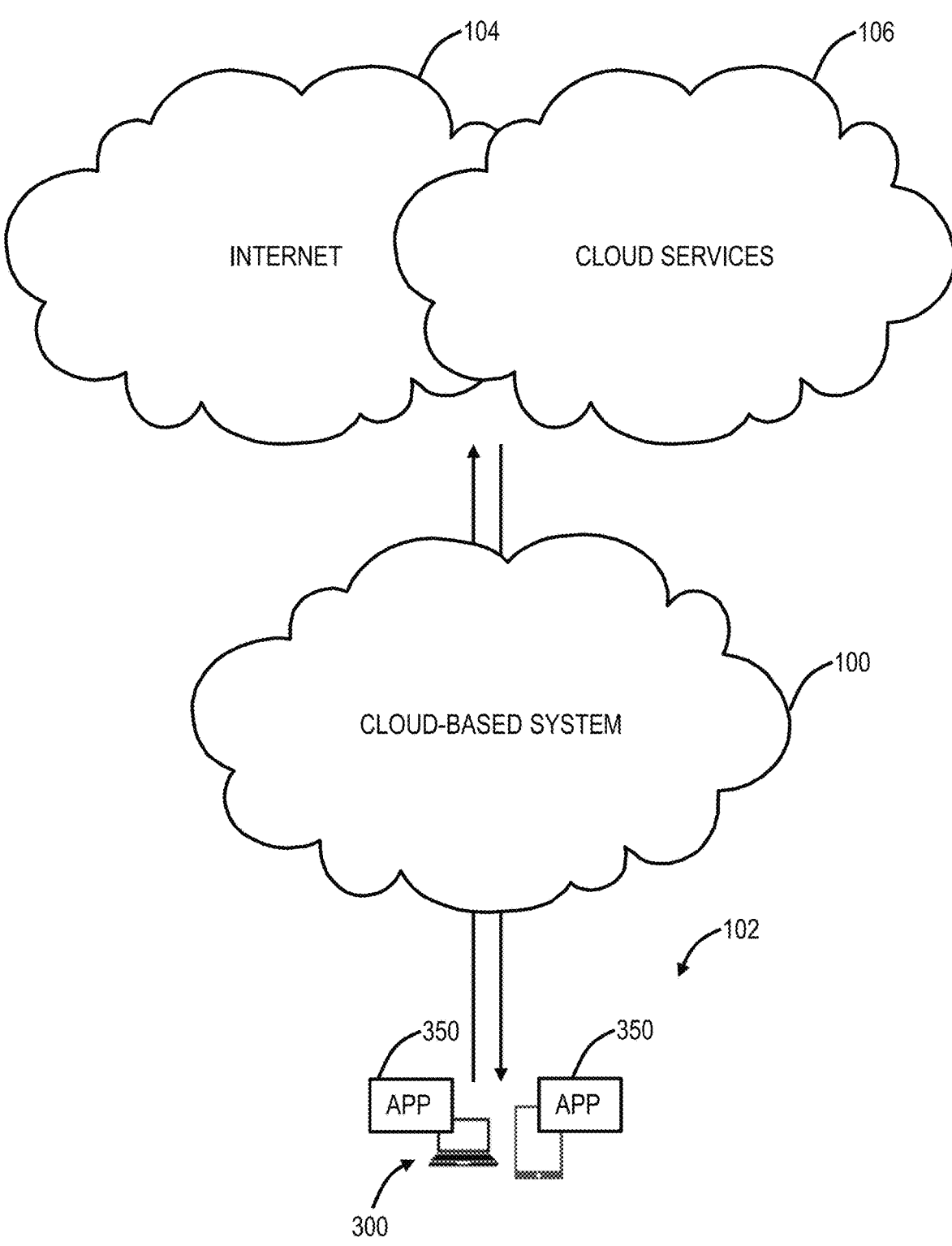
FIG. 7 is a network diagram of the cloud-based system illustrating an application on user devices with users configured to operate through the cloud-based system.

FIG. 7 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best-in-class security with zero trust access to internal apps. As described herein, the application 350 can also be referred to as a connector application.

The application 350 is configured to auto-route traffic for seamless user experience. This can be protocol as well as application-specific, and the application 350 can route traffic with a nearest or best fit node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPsec VPN, authentication cookies, or user 102 setup.

Identity for Workloads

The cloud-based system 100 of the present disclosure is adapted to assign, persist, and utilize identities for users accessing resources through the cloud-based system 100 for enforcing policy. In various embodiments, the present systems and methods are adapted to not only assign, persist, and utilize identities for users, but also assign, persist, and utilize identities for workloads operating in the cloud-based system 100. For example, workload communication through the cloud-based system 100 can include API to API communication or any other machine to machine communication, where the cloud-based system 100 includes integrations with various third party resources such as Salesforce. As such, if a customer is provisioned with the third party resource/system, the cloud-based system 100 can receive a call back stating that the customer is provisioned with the third-party resource. That is, various companies/enterprises/third parties can have integrations with one another including the cloud-based system 100 to integrate their systems.

Workload machines are generally dynamic in nature and can be scaled up and scaled down based on load. Given the dynamic nature of workloads, it is very difficult to assign an identity to a specific workload and apply specific policies to the workload, because by the time the policy is created and enforced the workload may have spun down and a new one might have spun up in its place. The present disclosure provides a novel way by which identities can be assigned to workloads based on payloads which can be observed by proxies of the cloud-based system 100. It will be appreciated that while the various examples and embodiments described herein primarily reference workloads, the systems and methods can work for other types of clients as well.

Because workloads generally have a specific responsibility, they are designed to make external calls to other web services for which they need to be authorized. Even if the workload's life cycle is very dynamic, the basic authentication mechanism for the external calls it makes generally remains the same across restarts and redeployments. The present systems can use this property of the workload to assign identity and not be concerned about the actual machine which is making the call.

The systems can understand the various authentication schemes used by workloads and detect them. Based on detecting specific authentication schemes, identity information can be extracted from the payloads. In various embodiments, this can be done whether the authentication schemes are passed in the headers, query parameters, body, or other portion of a call/response payload and the systems can follow them across redirects. The systems can then use the identity that is detected based on the payload to perform one or more actions including applying policies to block unknown API calls and to better control the security posture via any of the security methods described herein.

In various embodiments, the systems and methods can detect workloads and assign identities to these workloads based on traffic that passes through the cloud-based system 100. In embodiments, this can include monitoring traffic from one or more workloads communication through the cloud-based system 100 to determine, through profiling, what the workload is. In other embodiments, credentials (identification information) can be intercepted from payloads to identify a workload's identity. For example, when a workload communicates with an external system, i.e., an application, service, etc. such as Salesforce, the payload must have some sort of credentials for the workload to be able to make a call. The credentials can be anything included in the payload which states various information associated with the originating workload so that the external system can enforce security policies on their side. The various embodiments described herein can be adapted to, because the traffic flows through the cloud-based system 100, intercept and collect these credentials in order to enforce its own security policies.

These systems and methods allow the cloud-based system 100 to centrally manage all outbound API access for better security. Further, this allows the application of policies for clients (rate limiting, access control, etc.) to overcome any limitations on the providers and have central policies across API providers. In embodiments, this can be implemented for static API key authentication and/or extended for all authentication schemes. Rate limiting is a technique used to control the rate at which certain actions or requests are allowed to be performed or processed while access control refers to the set of policies, procedures, and technologies used to regulate and restrict access to computer networks, systems, and resources.

In an embodiment, the systems and methods are adapted to monitor traffic through the cloud-based system 100. Based on the monitoring, the systems can identify identification information in payloads originating from workloads in the cloud-based system 100. This identification information can be included in headers of the payloads which allow the external system to which the payload is directed to identify the origination of the traffic. Again, this identification information allows the external system to enforce its own policy. Because this identification information can be "intercepted" in the cloud-based system 100, the cloud-based system 100 can assign an identity to the originating workload and enforce its own policies.

In embodiments, the identification information can be used to identify the type of workload from which the traffic is being originated. Based on this, the cloud-based system 100 can enforce policy based on the type of workload. For example, for specific types of workloads, identified via the present methods, the cloud-based system 100 can enforce specific policies. The identity/type of workloads can be dynamically identified based on the payload. The type of workload referring to a specific department of an enterprise, the specific function of the workload, etc. further, different policies can be enforced based on the type of workload such as compute workloads, storage workloads, networking workloads, web workloads, Internet-of-Things (IoT) workloads, etc.

Again, the present disclosure provides methods for discovery of workload identities. In some cases, the Identity is unknown, and since the traffic passes through the cloud-based system, the systems are able to discover and provide the identities to users, allowing the users to create policies on these yet unknown identities.

In an exemplary use case, a customer of the cloud-based system 100 may be an enterprise which has a plurality of departments. Each of these departments can be associated with a workload cluster. Typically, each department/workload cluster will be assigned a different key for accessing an external system such as Salesforce. By utilizing the present systems and methods, the cloud-based system 100 can identify from which department/workload cluster the traffic is originating from, and enforce policy based thereon. Because of this, the cloud-based system 100 can enforce policies based on the workloads, for example, allowing a sales department of the enterprise to access Salesforce, or any other external system, while blocking a marketing department from accessing the specific external system. That is, the enforcing policy can be based on the department to which a workload is assigned.

Process for Assigning Workload Identities

FIG. 8 is a flow chart of a process for determining and assigning identities to workloads in a cloud-based system. The process 450 includes monitoring traffic in a cloud-based system (step 452); extracting identification information from one or more payloads originating from one or more workloads operating in the cloud-based system (step 454); assigning an identity to each of the one or more workloads based on the identification information (step 456); and enforcing policies on the one or more workloads and traffic associated therewith based on the assigned identity (step 458).

The process 450 can further include wherein the monitoring includes inline monitoring of the one or more workloads associated with the cloud-based system. The one or more payloads can originate from the one or more workloads operating in the cloud-based system and can be directed to one or more external systems, wherein the one or more payloads are intercepted by the cloud-based system. The steps can further include identifying an authentication scheme used by the one or more workloads; and extracting identification information from one or more payloads based on the authentication scheme. Enforcing policies can include rate limiting, and access control based on an identity of a resource associated with the traffic. The identification information can be used to identify the type of workload from which the traffic originated. Policy can be enforced on traffic between the one or more workloads and one or more external systems based on a type of the one or more workloads. The one or more workloads can be associated with an enterprise having a plurality of departments, wherein the steps further include assigning each of the one or more workloads to a department of the plurality of departments based on the identification information. The enforcing policy can be based on a department to which a workload is assigned. The enforcing policy can include allowing or blocking traffic from a workload to an external system based on a department to which the workload is assigned.

Generating Sub-Identities for Workloads

The present systems and methods described herein can be further adapted to increase the enforcement of policy on communication between workloads and external systems. That is, the present systems and methods are adapted to, based on an identity/key assigned by an external system, generate one or more sub-identities for use within the cloud-based system.

Workload machines make API calls to external Software-as-a-Service (Saas) applications using specific authorization schemes. The workload application is generally registered with the SaaS provider and a specific key is provided for that workload by the provider. The key allows for the SaaS provider (external system) to identify the customer, provide specific access controls, enforce rate limits, etc. These keys are used as part of the configuration for the workload spin up. Since the keys are generally alphanumeric characters, a user can potentially take that key with them and still have access to company data, i.e., if the user leaves the company, and can have the ability to make calls without the previous company's knowledge.

Assuming all of the customer workload outbound traffic is flowing through the cloud-based system 100 and the original keys provided by the cloud providers are registered with the cloud-based system 100, the cloud-based system 100 can generate new keys (sub-identities) which are valid only within the customer context and within the cloud-based system 100 and provide the original keys to the end workloads. That is, the generated sub-identities can be customer specific, and only usable within the cloud-based system under the customer context. This allows the cloud-based system 100 to transparently replace the authorization keys for all traffic originating from the workload and replace it with the real cloud provider authorization keys inline if the policies allow for it. This prevents the scenario where even if the workload keys are leaked, they are still valid only if the traffic passes through the cloud-based system 100 under that specific customer context.

Figure 9:
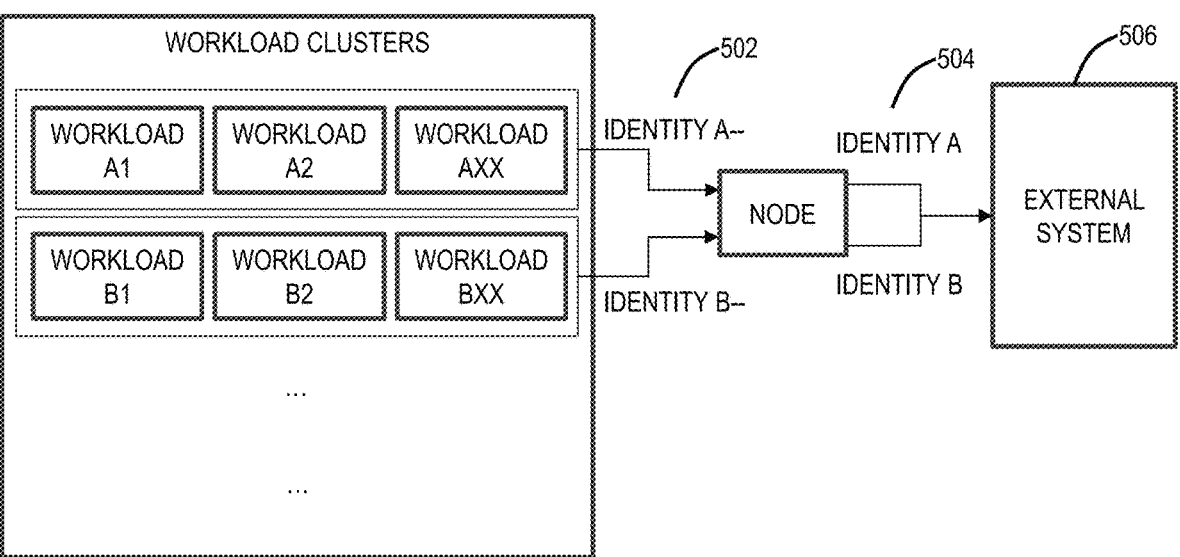
FIG. 9 is a flow diagram of sub-identity generation for workloads.

This also allows the cloud-based system 100 to control the life cycle of keys and provide features such as expiry time for the keys, and more granular security controls such as allowing the use of keys from a specific location, etc. more easily. That is, the cloud-based system stores the keys, and the workloads, users, etc. utilizing the cloud-based system 100 do not. In FIG. 9 the "A--" key is the sub-identity 502 generated by the cloud-based system 100, and "A" is the original key 504 provided by the original SaaS provider (external system 506). Thus, the original key is not shared with users and workloads, and the cloud-based system 100 generates one or more new keys to share with workloads and users, which correlates to the original key 504. The sub-key 502 is used in communications within the cloud-based system 100 and is converted to the original key 504 once the traffic leaves the cloud-based system 100 to the external system 506.

Because of the ability to identify workloads inline, the systems are able to perform various actions such as replacing the identification. In an exemplary use case, a customer of the cloud-based system 100 can be an enterprise that again includes a plurality of departments. When this enterprise creates an account with an external system 506, the enterprise can be given only one API key. Because of the desire to enforce policy, for example, on a per-department level, the systems and methods include the ability to generate a plurality of API credentials (sub-identities 502) from a single assigned API key to each of the plurality of departments.

FIG. 9 is a flow diagram of sub-identity generation for workloads. For example, an external system may provide an enterprise with a single identity (Identity A). In various embodiments, this identity is not shared with workloads, rather, the original identity 504 (Identity A) is stored, and the systems generate one or more new sub-identities 502 (Identity A-, Identity A--, etc.) off the original identity 504 (Identity A) that is then shared with the workloads. The systems know which sub-identity 502 is shared to which workloads; thus, policy can be enforced based on the sub-identity 502 present in the traffic. This is because the workloads will be using the sub-identity 502 which was assigned to it via the cloud-based system 100. In embodiments, any number of sub-identities 502 can be generated from an original identity 504 based on the number of workloads associated with an enterprise. For communication with the external system, the cloud-based system 100 can convert the generated sub-identities 502 back to the original identity 504 so that the external system 506 can operate as intended without knowing of the generated sub-identities 502. That is, the sub-identities 502 are only used within the cloud-based system 100, and once communication exits the cloud-based system 100, the systems convert the sub-identity 502 to the original identity 504 for the external system 506 in a sort of multiplexing process.

Additionally, because of these systems and methods, the risk of distribution of actual API keys is eliminated. This is because only the cloud-based system 100 stores the original identification, and the workloads only have access to the generated sub-identities 502 which have no meaning outside of the cloud-based system 100. Further, in various embodiments, the systems can translate various authentication methods. For example, an external system can switch its authentication method. In this scenario, with the present systems, only the cloud-based system needs to change its authentication method to match the external system, and the plurality of workloads do not.

Process for Generating Sub-Identities for Workloads

FIG. 10 is a flow chart of a process for generating sub-identities for workloads. The process 550 includes receiving a key from an external system (step 552); generating one or more sub-identities from the key (step 554); assigning the one or more sub-identities to one or more workloads (step 556); and enforcing policies on the one or more workloads and traffic associated therewith based on the one or more sub-identities (step 558).

The process 550 can further include performing inline monitoring via a cloud-based system of the one or more workloads; extracting identification information from one or more payloads originating from the one or more workloads, wherein the identification information includes a sub-identity; and enforcing policies on the one or more payloads based thereon. The one or more payloads can originate from the one or more workloads operating in a cloud-based system and are directed to the external system, wherein the one or more payloads are intercepted by the cloud-based system. Enforcing policies can include rate limiting, and access control based on a sub-identity identified in traffic. The one or more workloads can be associated with an enterprise having a plurality of departments, wherein the steps can further include: assigning each of the plurality of departments a sub-identity to utilize in payloads originating from workloads associated therewith. The enforcing policy can be based on a department to which a workload is assigned. The enforcing policy can include allowing or blocking traffic from a workload to the external system based on a department to which the workload is assigned. The one or more sub-identities can be customer specific, wherein the one or more sub-identities are only utilized within a cloud-based system. The steps can further include converting a sub-identity within a payload to the key prior to the payload reaching the external system. The key is not shared with the one or more workloads.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method comprising steps of:

receiving a key from an external system, the key is associated with a customer;

generating one or more sub-identities from the key, wherein the one or more sub-identities are specific to the customer and used only within a cloud-based system;

assigning the one or more sub-identities to one or more workloads of the customer, wherein the one or more sub-identities are used within the cloud-based system to prevent exposure of the key to the customer and the one or more workloads, and to enable lifecycle management of the key, granular security controls for the key, and centralized enforcement of access policies within the cloud-based system;

enforcing policies in the cloud-based system on the one or more workloads and one or more payloads associated therewith based on the one or more sub-identities; and converting the sub-identity back to the key prior to the one or more payloads reaching the external system.

2. The method of claim 1, wherein the steps further comprise:

performing, via the cloud-based system, inline monitoring of the one or more workloads;

extracting identification information from one or more payloads originating from the one or more workloads, wherein the identification information includes a sub-identity of the one or more sub-identities; and enforcing policies on the one or more payloads based thereon.

3. The method of claim 1, wherein the one or more payloads originate from the one or more workloads operating in a cloud-based system and are directed to the external system, and wherein the one or more payloads are intercepted by the cloud-based system.

4. The method of claim 1, wherein enforcing policies comprises rate limiting, and access control based on a sub-identity of the one or more sub-identities identified in traffic.

5. The method of claim 1, wherein the one or more workloads are associated with an enterprise having a plurality of departments, and wherein the steps further comprise:

assigning each of the plurality of departments a sub-identity of the one or more sub-identities to utilize in payloads originating from workloads associated therewith.

6. The method of claim 5, wherein the enforcing policy is based on a department to which a workload is assigned.

7. The method of claim 5, wherein the enforcing policy includes allowing or blocking traffic from a workload to the external system based on a department to which the workload is assigned.

8. The method of claim 1, wherein the one or more sub-identities are customer specific, and wherein the one or more sub-identities are only utilized within a cloud-based system.

9. The method of claim 8, wherein the steps further comprise:

converting a sub-identity of the one or more sub-identities within a payload to the key prior to the payload reaching the external system.

10. The method of claim 1, wherein the key is not shared with the one or more workloads.

11. A non-transitory computer-readable medium comprising instructions that, when executed, cause one or more processors to perform steps of:

receiving a key from an external system, the key is associated with a customer;

generating one or more sub-identities from the key, wherein the one or more sub-identities are specific to the customer and used only within a cloud-based system;

assigning the one or more sub-identities to one or more workloads of the customer, wherein the one or more sub-identities are used within the cloud-based system to prevent exposure of the key to the customer and the one or more workloads and to enable lifecycle management of the key, granular security controls for the key, and centralized enforcement of access policies within the cloud-based system;

enforcing policies in the cloud-based system on the one or more workloads and one or more payloads associated therewith based on the one or more sub-identities; and converting the sub-identity back to the key prior to the one or more payloads reaching the external system.

12. The non-transitory computer-readable medium of claim 11, wherein the steps further comprise:

performing, via the cloud-based system, inline monitoring of the one or more workloads;

extracting identification information from one or more payloads originating from the one or more workloads, wherein the identification information includes a sub-identity of the one or more sub-identities; and enforcing policies on the one or more payloads based thereon.

13. The non-transitory computer-readable medium of claim 11, wherein the one or more payloads originate from the one or more workloads operating in a cloud-based system and are directed to the external system, and wherein the one or more payloads are intercepted by the cloud-based system.

14. The non-transitory computer-readable medium of claim 11, wherein enforcing policies comprises rate limiting, and access control based on a sub-identity of the one or more sub-identities identified in traffic.

15. The non-transitory computer-readable medium of claim 11, wherein the one or more workloads are associated with an enterprise having a plurality of departments, and wherein the steps further comprise:

assigning each of the plurality of departments a sub-identity of the one or more sub-identities to utilize in payloads originating from workloads associated therewith.

16. The non-transitory computer-readable medium of claim 15, wherein the enforcing policy is based on a department to which a workload is assigned.

17. The non-transitory computer-readable medium of claim 15, wherein the enforcing policy includes allowing or blocking traffic from a workload to the external system based on a department to which the workload is assigned.

18. The non-transitory computer-readable medium of claim 11, wherein the one or more sub-identities are customer specific, and wherein the one or more sub-identities are only utilized within a cloud-based system.

19. The non-transitory computer-readable medium of claim 18, wherein the steps further comprise:

converting a sub-identity of the one or more sub-identities within a payload to the key prior to the payload reaching the external system.

20. The non-transitory computer-readable medium of claim 11, wherein the key is not shared with the one or more workloads.

* * * * *